(12) United States Patent
Doherty et al.

(10) Patent No.: US 12,023,769 B2
(45) Date of Patent: Jul. 2, 2024

(54) SYSTEM AND METHOD FOR AUTOMATED DRILLING ACTIVITY MONITORING

(71) Applicant: Caterpillar Global Mining LLC, Tucson, AR (US)

(72) Inventors: Thomas Frank Doherty, Brisbane (AU); Ben Lincoln Clare, Keperra (AU); Darryl Victor Collins, Jindalee (AU)

(73) Assignee: Caterpillar Global Mining LLC., Tucson, AZ (US)

( * ) Notice: Subject to any disclaimer, the term of this patent is extended or adjusted under 35 U.S.C. 154(b) by 683 days.

(21) Appl. No.: 16/791,064

(22) Filed: Feb. 14, 2020

(65) Prior Publication Data

US 2021/0252659 A1 Aug. 19, 2021

(51) Int. Cl.
*B23Q 17/12* (2006.01)
*B23Q 16/02* (2006.01)

(52) U.S. Cl.
CPC ........... *B23Q 17/12* (2013.01); *B23Q 16/022* (2013.01)

(58) Field of Classification Search
CPC ....... B23Q 16/022; B23Q 17/12; E21B 43/30; E21B 47/00; E21B 7/24
See application file for complete search history.

(56) References Cited

U.S. PATENT DOCUMENTS

| | | | | |
|---|---|---|---|---|
| 4,656,868 A | * | 4/1987 | Azuma | G05B 19/4065 83/72 |
| 4,793,421 A | * | 12/1988 | Jasinski | E21B 44/00 702/9 |
| 5,680,906 A | * | 10/1997 | Andrieux | E21B 44/00 175/45 |
| 7,082,821 B2 | | 8/2006 | Chen et al. | |

(Continued)

FOREIGN PATENT DOCUMENTS

| | | |
|---|---|---|
| CN | 102182449 A | 9/2011 |
| CN | 103899293 A | 7/2014 |

(Continued)

OTHER PUBLICATIONS

Written Opinion and International Search Report for International Patent Appln No. PCT/US2021/016120, dated May 7, 2021 (9 pgs).

*Primary Examiner* — Kyle R Quigley

(57) ABSTRACT

A drilling detection system may include a drilling detection circuitry including one or more detection processors configured to receive a vibration signal indicative of vibration associated with a drilling machine configured to drill holes into a substrate and receive a movement signal indicative of movement of the drilling machine relative to one or more positions on the substrate. The one or more detection processors may also be configured to determine vibration associated with the drilling machine, and determine movement associated with the drilling machine. The one or more detection processors may also be configured to determine, based at least in part on the vibration associated with the (Continued)

drilling machine and the movement associated with the drilling machine, the drilling machine has drilled holes into the substrate and a position on the substrate at which the drilling machine has drilled the holes into the substrate.

20 Claims, 7 Drawing Sheets

(56) References Cited

U.S. PATENT DOCUMENTS

| | | | |
|---|---|---|---|
| 9,129,236 B2* | 9/2015 | Elinas | G06Q 10/06 |
| 9,593,570 B2 | 3/2017 | Friend | |
| 2005/0173153 A1 | 8/2005 | Rus | |
| 2010/0116165 A1* | 5/2010 | Moore | F42D 3/04 |
| | | | 102/311 |
| 2015/0106041 A1* | 4/2015 | Bess | G01H 1/00 |
| | | | 702/56 |
| 2015/0233718 A1* | 8/2015 | Grokop | H04W 64/006 |
| | | | 701/501 |
| 2015/0332409 A1* | 11/2015 | Menon | G06Q 40/02 |
| | | | 701/31.4 |
| 2016/0003009 A1* | 1/2016 | Oppolzer | E21B 7/02 |
| | | | 175/24 |
| 2016/0017703 A1* | 1/2016 | Friend | E21B 7/02 |
| | | | 340/853.8 |
| 2018/0371894 A1 | 12/2018 | Wang et al. | |
| 2019/0257964 A1* | 8/2019 | Palmer | G01V 1/145 |
| 2021/0389172 A1* | 12/2021 | Jonsson | G01H 3/04 |

FOREIGN PATENT DOCUMENTS

| | | | | |
|---|---|---|---|---|
| CN | 104727807 A | | 6/2015 | |
| SE | 1851357-2 | * | 1/2020 | G01H 3/04 |
| WO | 9618118 | | 6/1996 | |
| WO | 2016065402 | | 5/2016 | |
| WO | WO-2019000037 A1 | * | 1/2019 | E21B 44/00 |
| WO | WO-2020089349 A1 | * | 5/2020 | G01H 3/04 |

* cited by examiner

SYSTEM AND METHOD FOR AUTOMATED DRILLING ACTIVITY MONITORING

TECHNICAL FIELD

The present disclosure relates to a system and method for detecting drilling at a worksite, and more particularly, to a system and method for detecting drilling associated with a drilling machine at a worksite.

BACKGROUND

Machines may be used to perform variety of tasks at a worksite. For example, a machine may be used to drill holes into a substrate, which may include the terrain at a worksite, such as a mining operation. In such worksites, it may be desirable to record information related to drilling, such as how many holes have been drilled by a particular machine and the locations of the holes. Such information may be recorded manually by an operator of the machine. However, manually recorded information may suffer from inaccuracies, such as the incorrect number of holes and inaccurate locations for the holes. Such inaccuracies may result in inefficient management of operation of the machine and the worksite. In addition, the manually recorded information may need to be manually entered into a database for it to be useful to a manager of the worksite, which may result in additional inaccuracies and the need for additional personnel, particularly for a worksite having a large number of machines operating substantially simultaneously. As a result, it may be desirable to provide a system and method that mitigates or eliminates such drawbacks.

An attempt to provide a system for estimating the pose of a drill is described in U.S. Pat. No. 9,593,570 B2 to Friend ("the '570 patent"), issued Mar. 14, 2017. Specifically, the '570 patent describes a system and method for estimating the pose of a drill that includes receiving a location signal from a locating device, a first signal indicative of an angular rate of the drill, and a second signal indicative of an acceleration of the drill. The system and method of the '570 patent may also include determining an operation state of the drill and the pose of the drill based on the received location signal, first signal, second signal, and the determined operation state of the drill.

Although the '570 patent purports to provide a system and method for estimating the pose of a drill, the '570 patent may rely on relatively expensive sensors and related devices to determine the pose. Accordingly, a drilling activity tracking system is desired which can be easily installed with minimal instrumentation and which can be operated without operator intervention. The systems and methods described herein may be directed to addressing one or more of the possible concerns set forth above.

SUMMARY

According to a first aspect, a drilling detection system may include a drilling detection circuitry including one or more detection processors configured to receive a vibration signal indicative of vibration associated with a drilling machine configured to drill holes into a substrate and receive a movement signal indicative of movement of the drilling machine relative to one or more positions on the substrate. The one or more detection processors may also be configured to determine vibration associated with the drilling machine, and determine movement associated with the drilling machine. The one or more detection processors may also be configured to determine, based at least in part on the vibration associated with the drilling machine and the movement associated with the drilling machine, the drilling machine has drilled holes into the substrate and a position on the substrate at which the drilling machine has drilled the holes into the substrate.

According to a further aspect, a method for detecting drilling occurrences associated with a drilling machine configured to drill holes into a substrate may include receiving a vibration signal indicative of vibration associated with a drilling machine configured to drill holes into a substrate. The method may also include receiving a movement signal indicative of movement of the drilling machine relative to one or more positions on the substrate. The method may further include determining vibration associated with the drilling machine, and determining movement associated with the drilling machine. The method may further include determining, based at least in part on the vibration associated with the drilling machine and the movement associated with the drilling machine, the drilling machine has drilled holes into the substrate and a position on the substrate at which the drilling machine has drilled the holes into the substrate.

According to another aspect, a machine may include a chassis, a drilling apparatus coupled to the chassis and configured to drill holes into a substrate, and a drilling detection circuitry including one or more detection processors. The one or more detection processors may be configured to receive a vibration signal indicative of vibration associated with the machine and receive a movement signal indicative of movement of the machine relative to one or more positions on the substrate. The one or more detection processors may also be configured to determine vibration associated with the machine, and determine movement associated with the machine. The one or more detection processors may further be configured to determine, based at least in part on the vibration associated with the machine and the movement associated with the machine, the machine has drilled holes into the substrate and a position on the substrate at which the machine has drilled the holes into the substrate.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

The present disclosure is generally directed to systems and methods for detecting drilling associated with a drilling machine at a worksite. In some examples, the systems and methods may be configured to receive one or more vibration signals indicative of vibration associated with a drilling machine configured to drill holes into a substrate and receive one or more movement signals indicative of movement of the drilling machine relative to one or more positions on the substrate. In some examples, the systems and methods may be configured to determine vibration associated with the drilling machine, for example, based at least in part on the one or more vibration signals, and determine movement associated with the drilling machine, for example, based at least in part on the one or more movement signals. In some examples, the systems and methods may be configured to determine, based at least in part on the vibration associated with the drilling machine and the movement associated with the drilling machine, that the drilling machine has drilled holes into the substrate and a position on the substrate at which the drilling machine has drilled the holes into the substrate. In at least some such examples, the systems and methods may be able to provide a record to the holes drilled and/or the respective locations of the holes, and the record may be communicated to an output device, which may include, for example, a transmitter configured to communicate the record via a wireless communication network to a database, a display device, a worksite management system, etc., which may result in improving the performance and/or efficiency associated with drilling holes at the worksite.

Figure 1:
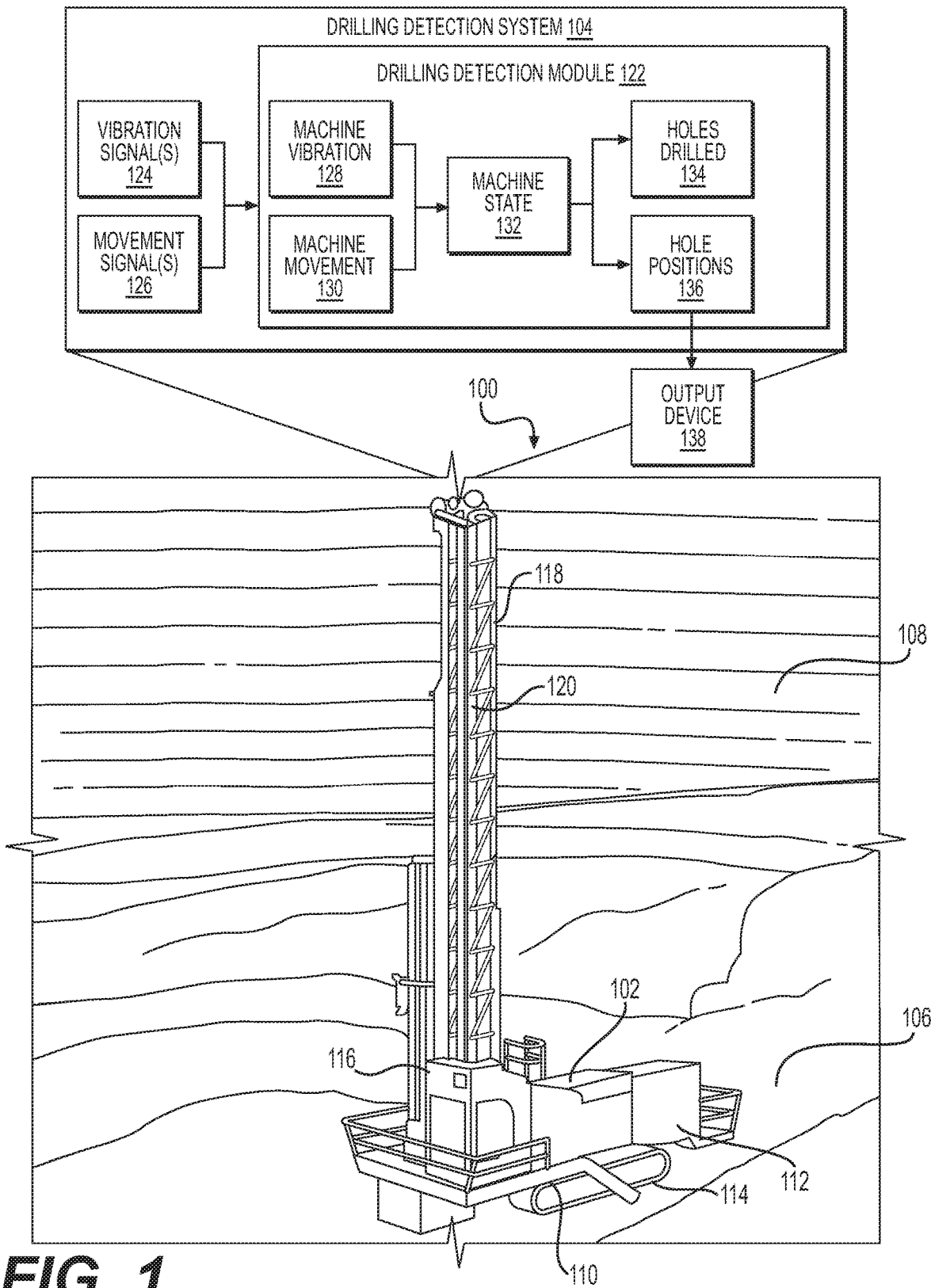
FIG. 1 is a block diagram depicting a schematic perspective view of an example environment including an example drilling machine including an example drilling detection system.

FIG. 1 is a block diagram depicting a schematic perspective view of an example environment 100, such as a worksite (e.g., a mining worksite), and an example drilling machine 102 having an associated drilling detection system 104. As detailed further below, the drilling detection system 104 can determine whether the drilling machine 102 has drilled holes into a substrate 106 associated with the worksite and/or respective positions on the substrate 106 at which the drilling machine 102 has drilled the holes. The environment 100 may include any terrain 108 on which the drilling machine 102 operates. The example drilling machine 102 shown in FIG. 1 may be any machine configured to drill holes into a substrate at the worksite. For example, the worksite may support a number of operations, including, for example, a mining operation, and the operation may include sub-operations for removing and processing material, such as drilling, blasting, and hauling. The drilling sub-operation may be performed by the drilling machine 102, which may be configured to drill holes in a surface of the substrate 106. In some examples, explosives may be received in the drilled holes for controlled detonation, and after detonation, loosened material remaining in the location of the detonation may be hauled away for removal purposes and/or processing, for example, via other machines, such as loaders and haul trucks.

The example drilling machine 102 shown in FIG. 1 includes a chassis 110 to which is coupled a power source 112 configured to supply power for operation of the drilling machine 102, including, for example, operating work implements, electronics, and steering, and/or for supplying torque to drive members to propel the drilling machine 102 across the terrain 108. In some examples, the power source 112 may include an internal combustion engine, such as a compression-ignition engine, a spark-ignition engine, and/or an electric power source. It is also contemplated that the power source 112 may be located remotely from the drilling machine 12. For example, the power source 112 may include an electric storage device and/or a generator electrically-coupled to the drilling machine 12 via a length of electrical cord.

As a shown in FIG. 1, the drilling machine 102 may include two opposing tracks 114 coupled to the chassis 110 and configured to propel the drilling machine 102 across the terrain 108 (only a single track 114 is visible in FIG. 1). Although the example drilling machine 102 includes tracks 114, it is contemplated that the drilling machine 102 may include one or more wheels instead of, or in addition to, the tracks 114. The example drilling machine 102 also includes a cab 116 coupled to the chassis 110 for protecting and/or providing comfort for a human operator of the drilling machine 102 and/or for protecting control-related devices of the drilling machine 102, which may be configured to at least partially control operation of the drilling machine 102. In some examples, the drilling machine 102 may be manually operated, for example, by a human operator onboard the drilling machine 102 and/or by a human operator located remotely from the drilling machine 102. In some examples, the drilling machine 102 may be semi-autonomous or fully-autonomous and able to operate without an onboard or remote human operator. For example, the drilling machine 102 may be semi-autonomous and configured be at least partially controlled with the assistance of a human operator located either remote from the drilling machine 102 or onboard the drilling machine 102. In some examples, the drilling machine 102 may be substantially fully-autonomous and configured to be controlled, for example, without onboard or remotely-located assistance of a human operator.

The example drilling machine 102 shown in FIG. 1 also includes a drilling apparatus 118 coupled to the chassis 110 configured to drill holes into a substrate. The drilling apparatus 118 may include a mast 120 coupled to the chassis 110. The mast 120 may include a frame configured to hold a drill pipe, a drill bit, and a motor configured to rotate and advance drill bit to penetrate into the surface of the substrate 106. For example, the motor may be a hydraulic or electric motor powered by a power source, and, in some examples, the motor may be omitted, and the drill bit may be driven by the power source via one or more belts and/or gear trains. The mast 120 may be constructed of steel or any other appropriate material, and in some examples, the mast 120 may be pivotably coupled to the chassis 110 and configured to pivot via operation of one or more actuators (e.g., hydraulic actuators and/or electric actuators). Alternatively, the mast 120 may be pivotably connected to the chassis 110 via a boom. It is contemplated that the actuators may be configured to position the mast 120 substantially perpendicular to the chassis 110 in an extended configuration and substantially parallel to the chassis 110, for example, in a retracted configuration.

As shown in FIG. 1, the example drilling detection system 104 may include drilling detection circuitry 122 configured to receive one or more vibration signals 124 indicative of vibration associated with the drilling machine 102 and one or more movement signals 126 indicative of movement of the drilling machine 102 relative to one or more positions on the substrate 106 of the worksite. As explained in more detail herein with respect to FIG. 3, the one or more vibration signals 124 and/or the one or more movement signals 126 may be received from one or more sensors associated with the drilling machine 102. In some examples, the drilling detection circuitry 122 may be configured to determine machine vibration 128 associated with the drilling machine 102, for example, based at least in part on the one or more vibration signals 124. Furthermore, the drilling detection circuitry 122 may also be configured to determine machine movement 130 associated with the drilling machine 102, for example, based at least in part on the one or more movement signals 126. In some examples, the drilling detection circuitry 122 may be configured to determine, based at least in part on the machine vibration 128 and the machine movement 130, a machine state 132 associated with the drilling machine 102. In some examples, the machine state 132 of the drilling machine 102 may include one or more of shaking and moving, shaking and stopped, not shaking and moving, or not shaking and stopped. As explained herein with respect to FIG. 3, based at least in part on the machine state 132, the drilling detection circuitry 122 may be configured to determine whether the drilling machine 102 has drilled holes in the substrate 106 (e.g., the number of holes drilled 134) and/or the respective positions of one or more of the holes drilled 134 (e.g., the hole positions 136).

As shown in FIG. 1, the drilling detection system 104 may be configured to communicate the holes drilled 134 and/or the hole positions 136 to an output device 138. In some examples, the output device 138 may include a data storage device coupled to the drilling machine 102 (e.g., a memory device associated with an electronic control module associated with the drilling machine 102) for later downloading via an appropriate device (e.g., a mobile computing device). In some examples, the output device 138 may include a transmitter associated with the drilling machine 102 (e.g., a transmitter or transceiver associated with an electronic control module associated with the drilling machine 102) configured to communicate information related to the drilling machine 102, the holes drilled 134, and/or the hole positions 136 to a location remote from the drilling machine 102, for example, via a wireless communications network. In some examples, the location remote from the drilling machine 102 may include an on-site and/or an off-site facility at which the information may be useful, such as a worksite supervisor's office and/or an office associated with an entity managing operations at the worksite. Such locations may include additional computing devices configured to use the information received from the drilling machine 102 for performing additional calculations and data manipulation operations. In some examples, some portions or all of the drilling detection system 104 may be either on-board the drilling machine 102 or at a location remote from the drilling machine 102.

Figure 2:
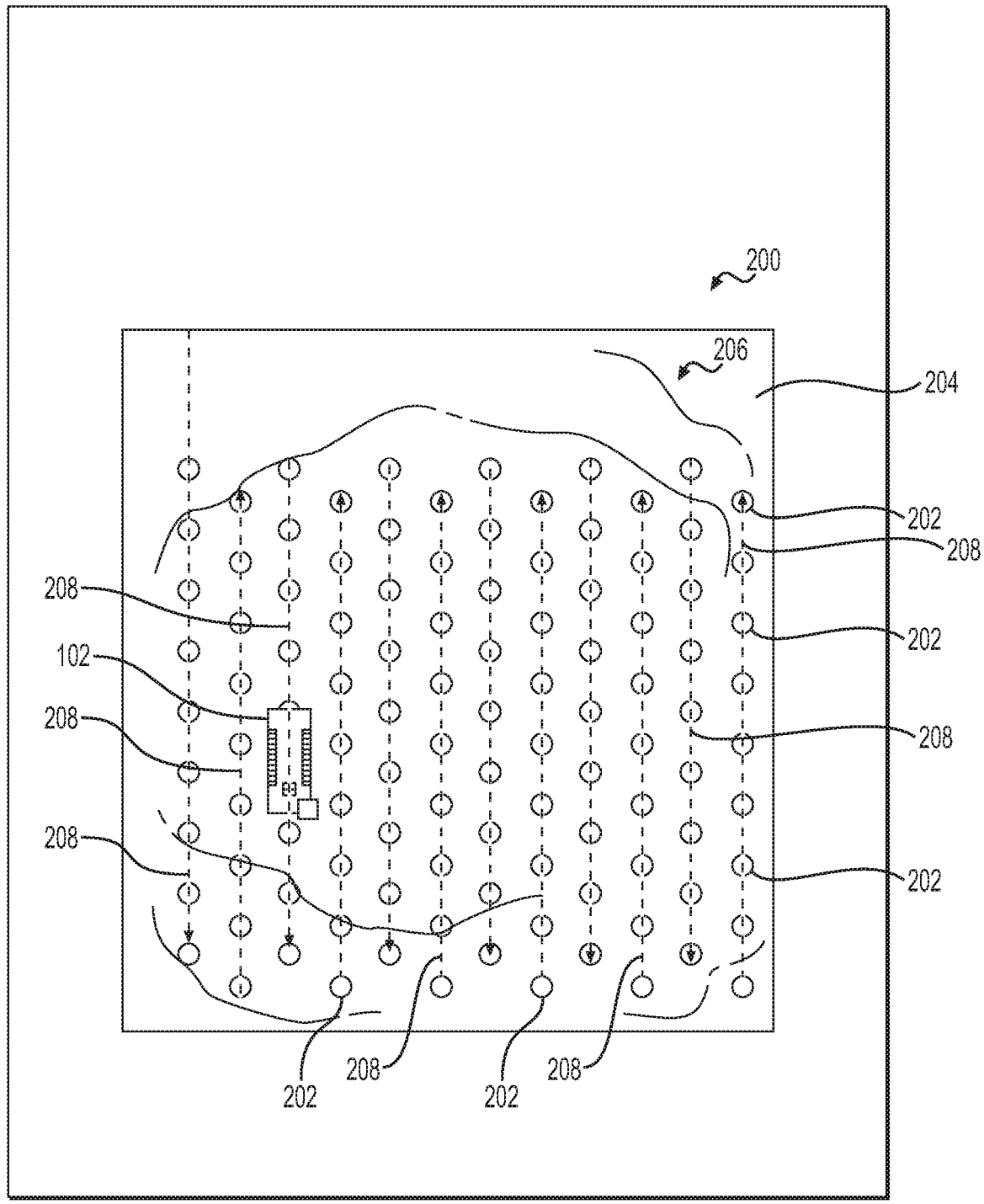
FIG. 2 is a schematic top view of an example environment including example holes drilled in an example substrate.

FIG. 2 is a schematic top view of an example environment 200 (e.g., a mining worksite) including example holes 202 drilled in an example substrate 204 by an example drilling machine 102. FIG. 2 shows an example pattern 206 of holes 202 that may be drilled into the substrate 204. In some examples, the pattern 206 may include a plurality of lines 208 of holes 202 drilled by the drilling machine 102. In some examples, the pattern 206 may be predetermined based on positions on the substrate 204 at which the holes 202 are desired for the subsequent receipt of explosives for later controlled detonation to prepare at least some the material of the substrate 204 for removal, for example, during a mining operation at a mining worksite. In some examples, the pattern 206 may be at least partially random, for example, such that the pattern 206 does not include a plurality of lines of holes 202, but rather, includes holes 202 located at positions at least partially randomly scattered across the area of the substrate 204 desired for preparation via detonation of explosives.

Figure 3:
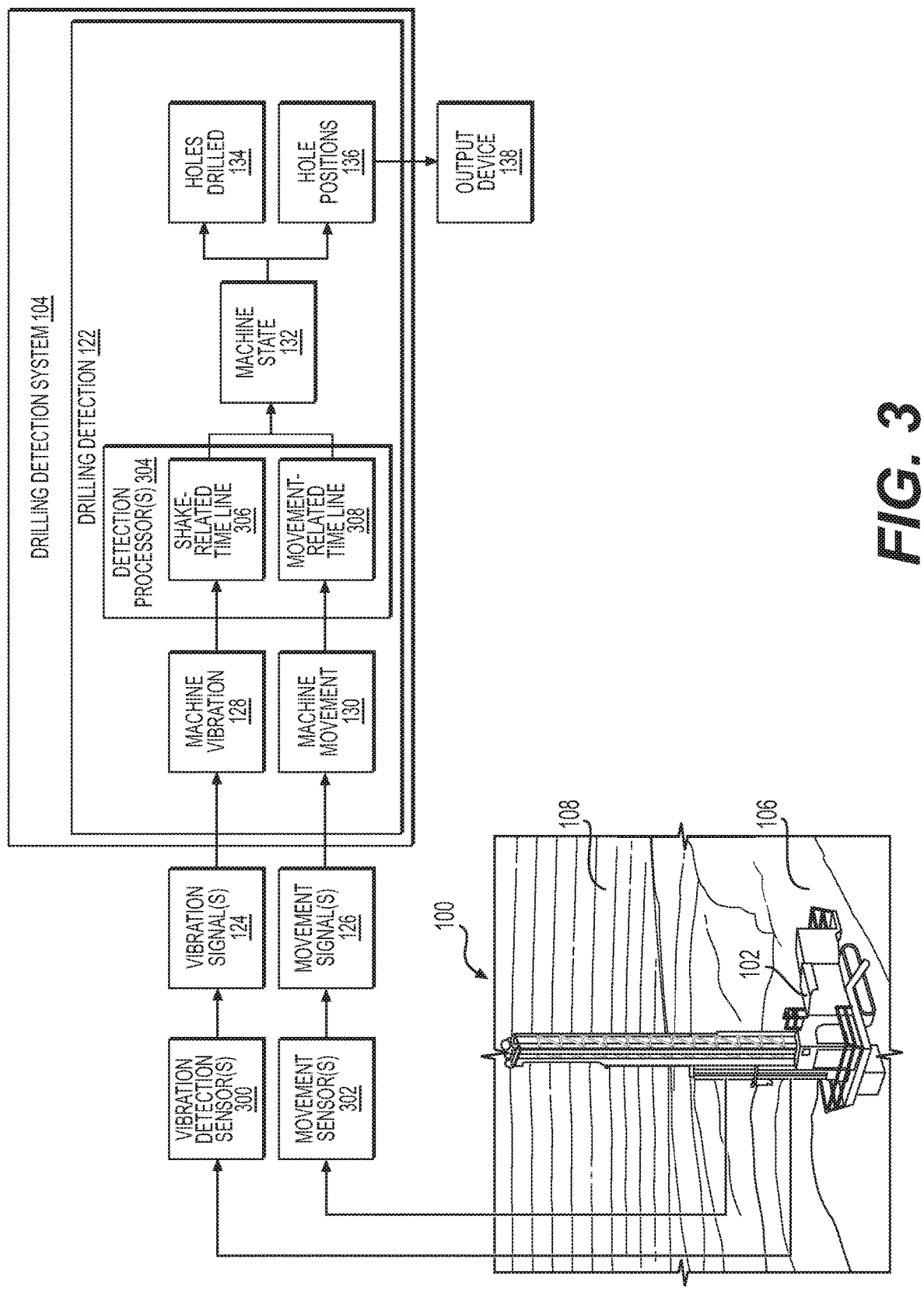
FIG. 3 is a block diagram illustrating an example drilling detection system including an example drilling detection circuitry configured to detect holes drilled and/or hole positions.

FIG. 3 is a block diagram illustrating an example drilling detection system 104 including an example drilling detection circuitry 122 configured to detect holes drilled 134 and determine hole positions 136 associated with operation of a drilling machine 102. The example shown in FIG. 3 may include one or more vibration detection sensor(s) 300 and/or one more movement sensor(s) 302. In some examples, the vibration detection sensor(s) 300 may include any sensors configured to generate one or more vibration signals 124 indicative of vibration associated with the drilling machine 102. For example, the vibration detection sensor(s) 300 may include one or more accelerometers, one of more gyroscopes, and/or one or more inertial measurement units (IMUs). In some examples, the movement sensor(s) 302 may include any sensors configured to generate one or more movement signals 126 indicative of movement of the drilling machine 102, for example, relative to the substrate 106. For example, the movement sensor(s) 302 may include one or more global position system (GPS) receivers configured to receive satellite signals from one or more global position system (GPS) satellites and estimate a position of the drilling machine 102 based at least in part on the satellite signals. In some examples, the one or more movement sensor(s) 302 may include one or more imagers, one or more light detection and ranging (LIDAR) sensors, one or more sound navigation ranging (SONAR) sensors, and/or one or more radio detection and ranging (RADAR) sensors. In some examples, the vibration detection sensor(s) 300 and/or the one more movement sensor(s) 302 may be relatively low-cost sensors, for example, such as sensors at least similar to those included in hand-held computing devices, such as smart phones. For example, the GPS sensors may be sensors having an accuracy ranging from, for example, about 1 meter to about 5 meters. In some examples, the vibration detection sensor(s) 300 and/or the movement sensor(s) 302 may be incorporated into an electronic control module coupled to the drilling machine 102 and configured to at least partially control operation of the drilling machine and/or record data associated with operation of the drilling machine 102.

As shown in FIG. 3, the one or more vibration detection sensor(s) 300 may be configured to generate the one or more vibration signals 124, and the one or more movement sensor(s) 302 may be configured to generate the one or more movement signals 126, which may be communicated to the drilling detection system 104, at least portions of which may be coupled to the drilling machine 102 or located remotely from the drilling machine 102. In some examples, the drilling detection circuitry 122 of the drilling detection system 104 may be configured to determine the machine vibration 128 associated with the drilling machine 102, for example, based at least in part on the one or more vibration signals 124, and determine the machine movement 130 associated with the drilling machine 102, for example, based at least in part on the one or more movement signals 126.

In some examples, the drilling detection circuitry 122 may be configured to determine, based at least in part on the machine vibration 128 and the machine movement 130, a machine state 132 associated with the drilling machine 102. In some examples, the machine state 132 of the drilling machine 102 may include one or more of shaking and moving, shaking and stopped, not shaking and moving, or not shaking and stopped. In some examples, the drilling detection circuitry 122 may include one or more detection processor(s) 304, and the one or more detection processor(s) 304 may be configured to determine a shake-related time line 306 and/or a movement-related time line 308, and based at least in part on the shake-related time line 306 and/or the movement-related time line 308, determine the machine state 132. For example, the shake-related time line 306 may be indicative of the drilling machine 102 shaking or not shaking as a function of time, and the movement-related time line 308 may be indicative of the drilling machine 102 changing location relative to the substrate 106 as a function of time or not moving relative to the substrate 106 as a function of time. As explained herein with respect to FIGS. 4 and 5, the one or more detection processor(s) 304 may be configured to temporally align the shake-related time line 306 and the movement-related time line 308, for example, so that shaking of the drilling machine 102 and movement of the drilling machine 102 occurring concurrently or substantially simultaneously may be evaluated to determine, for example, when the drilling machine 102 is shaking and is moving from a first position to a second position, when the drilling machine 102 is shaking and is not moving from a first position to a second position, when the drilling machine 102 is not shaking and is moving from a first position to a second position, or when the drilling machine 102 is not shaking and is not moving from a first position to a second position. Based on these example determinations, the one or more detection processor(s) 304 may be configured to determine the machine state 132.

Based at least in part on the machine state 132, the drilling detection circuitry 122 (e.g., the detection processor(s) 304) may be configured to determine whether the drilling machine 102 has drilled holes in the substrate 106 (e.g., the number of holes drilled 134) and the respective positions of one or more of the holes drilled 134 (e.g., the hole positions 136). For example, when the drilling machine 102 is shaking and is moving from a first position to second position, the one or more detection processor(s) 304 may determine that the drilling machine 102 is moving between positions, but not drilling a hole in the substrate 106. In contrast, in some examples, when the drilling machine 102 is shaking and is not moving from a first position to a second position, the one or more detection processor(s) 304 may determine that the drilling machine 102 is drilling a hole in the substrate 106. In some examples, when the drilling machine 102 is not shaking and is not moving from a first position to a second position, the one or more detection processor(s) 304 may determine that the drilling machine 102 is at idle (e.g., it is neither drilling a hole nor moving between positions). In some examples, when the drilling machine 102 is not shaking and is moving from a first position to second position, the one or more detection processor(s) 304 may determine that the drilling machine 102 has been loaded on a trailer and is being moved to another location, either on the worksite or to another worksite.

In some examples, the one or more detection processor(s) 304 may be configured to perform data analysis in order to determine whether the vibration signals 124 and/or the movement signals 126 are indicative of shaking associated with drilling by the drilling machine 102 and/or are indicative of movement of the drilling machine 102, respectively. For example, shaking of the drilling machine 102 may result from movement of the drilling machine 102. In some examples, the one or more detection processor(s) 304 may use filtering techniques (e.g., using a Kalman filter) and/or statistical analysis techniques to determine whether the vibration signals 124 are indicative of shaking associated with drilling by the drilling machine 102 or are indicative of shaking associated with movement of the drilling machine 102. In some examples, the one or more detection processor(s) 304 may be configured to perform data analysis in order to determine whether the movement signals 126 are indicative of movement of the drilling machine 102. For example, some relatively low-cost GPS systems have an accuracy ranging from about 1 meter to about 5 meters. For such GPS systems, the movement signals 126 may be an indication of signal drift rather than actual movement of the device or machine to which the GPS receiver of the GPS system is coupled. In some examples, the one or more detection processor(s) 304 may use filtering techniques (e.g., using a Kalman filter) and/or statistical analysis techniques to determine whether the movement signals 126 are indicative of actual movement associated with the drilling machine 102 or are indicative of signal drift rather than actual movement of the drilling machine 102.

As shown in FIG. 3, the drilling detection system 104 may be configured to communicate the holes drilled 134 and/or the hole positions 136 to the output device 138, for example, as described herein with respect to FIG. 1.

Figure 4:
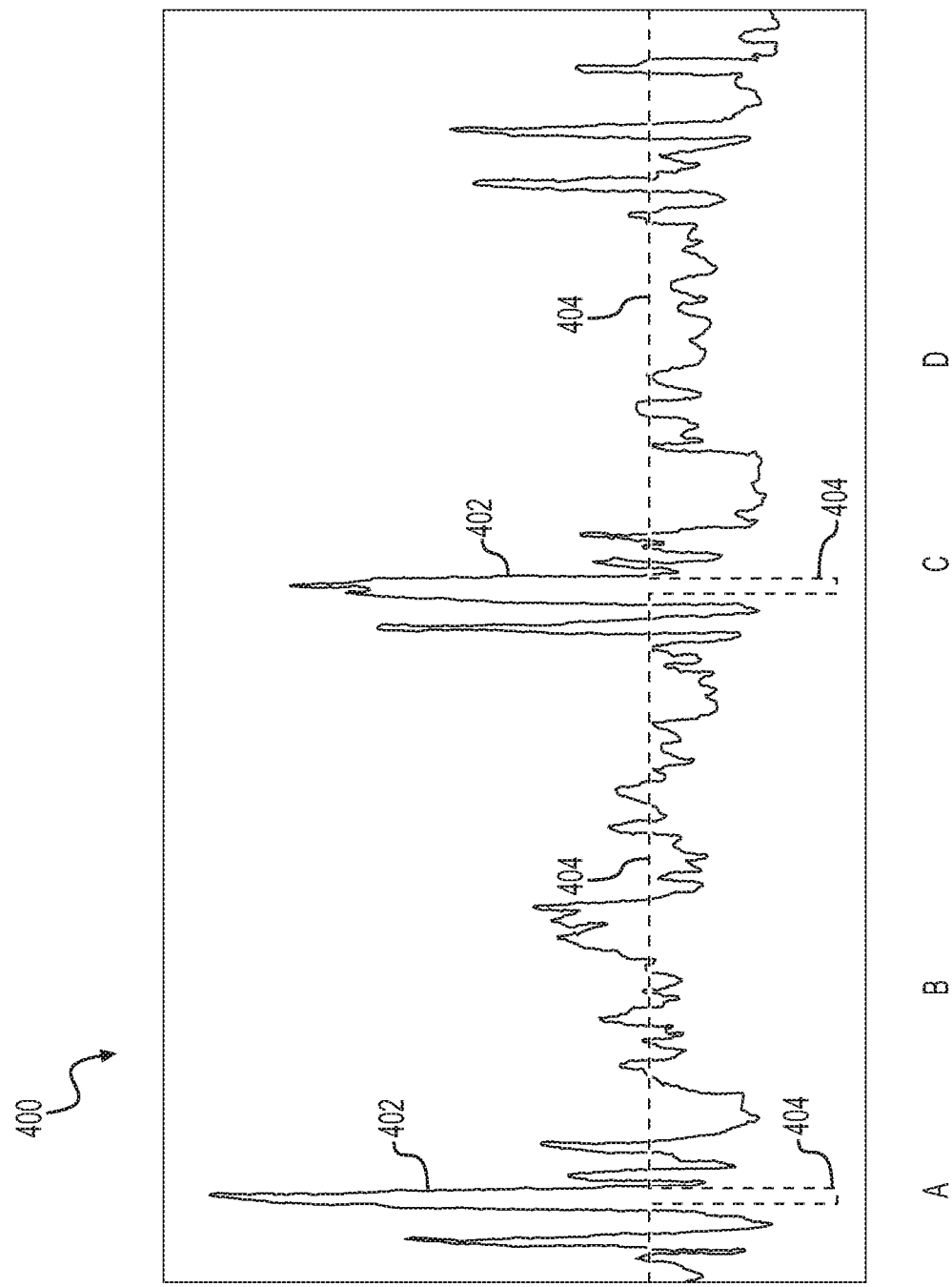
FIG. 4 is a graph showing an example of a shake-related time line and a movement-related time line associated with example operation of a drilling machine.

FIG. 4 is a graph 400 showing examples of a shake-related time line 306 and a movement-related time line 308 associated with example operation of an example drilling machine 102. In FIG. 4, a solid line 402 represents a sum of X-axis, Y-axis, and Z-axis acceleration standard deviations as a function of time derived from the vibration signals 124, for example, by the one or more detection processor(s) 304. In some examples, the vibration signals 124 are generated using information from an inertial measurement unit (IMU). Relative to the solid line 402, the Y-axis of the graph 400 is indicative of the magnitude of the sum of X-axis, Y-axis, and Z-axis acceleration standard deviations, and the X-axis of the graph 400 is indicative of time. In a non-limiting example, an IMU may generate signals for acceleration in each of the X-, Y-, and Z-directions at a frequency of 100 Hz, and these signals may be down sampled to a 1 Hz signal, e.g., by calculating an average and standard deviation of the 100 samples. Such downsampling can reduce an amount of data to be transmitted, while still providing meaningful information about movement. The solid line 402 illustrates sums of these standard deviations to give a combined magnitude of variation that is directionless. In examples, the direction of the motion may be irrelevant, as operation of the drilling machine 102 can cause motion in any or all of the X-, Y-, and Z-directions. For instance, the solid line 402 may be an example of the shake-related time line 306.

The dashed line 404 represents movement of the drilling machine 102 as a function of time derived from the movement signals 126, for example, by the one or more detection processor(s) 304. In some examples, the movement signals 126 can be derived from GPS or other position information. Relative to the dashed line 404, the Y-axis of the graph 400 is indicative of movement of the drilling machine 102, and the X-axis of the graph 400 is indicative of time. The dashed line 404 may be indicative of the movement-related time line 308. In the example shown, the relatively high levels of the dashed line 404 (e.g., in the sections labelled B and D in the graph 400) are indicative of the drilling machine 102 being stopped, and the relatively lower levels of the dashed line 404 (e.g., in the sections labelled A and C in the graph 400) are indicative of the drilling machine 102 moving, e.g., between positions on the substrate 106. In examples, the dashed line 404 represents a signal, which may be generated from low precision GPS, ground speed sensor inputs, idler rotation sensors, or other sensors.

Figure 5:
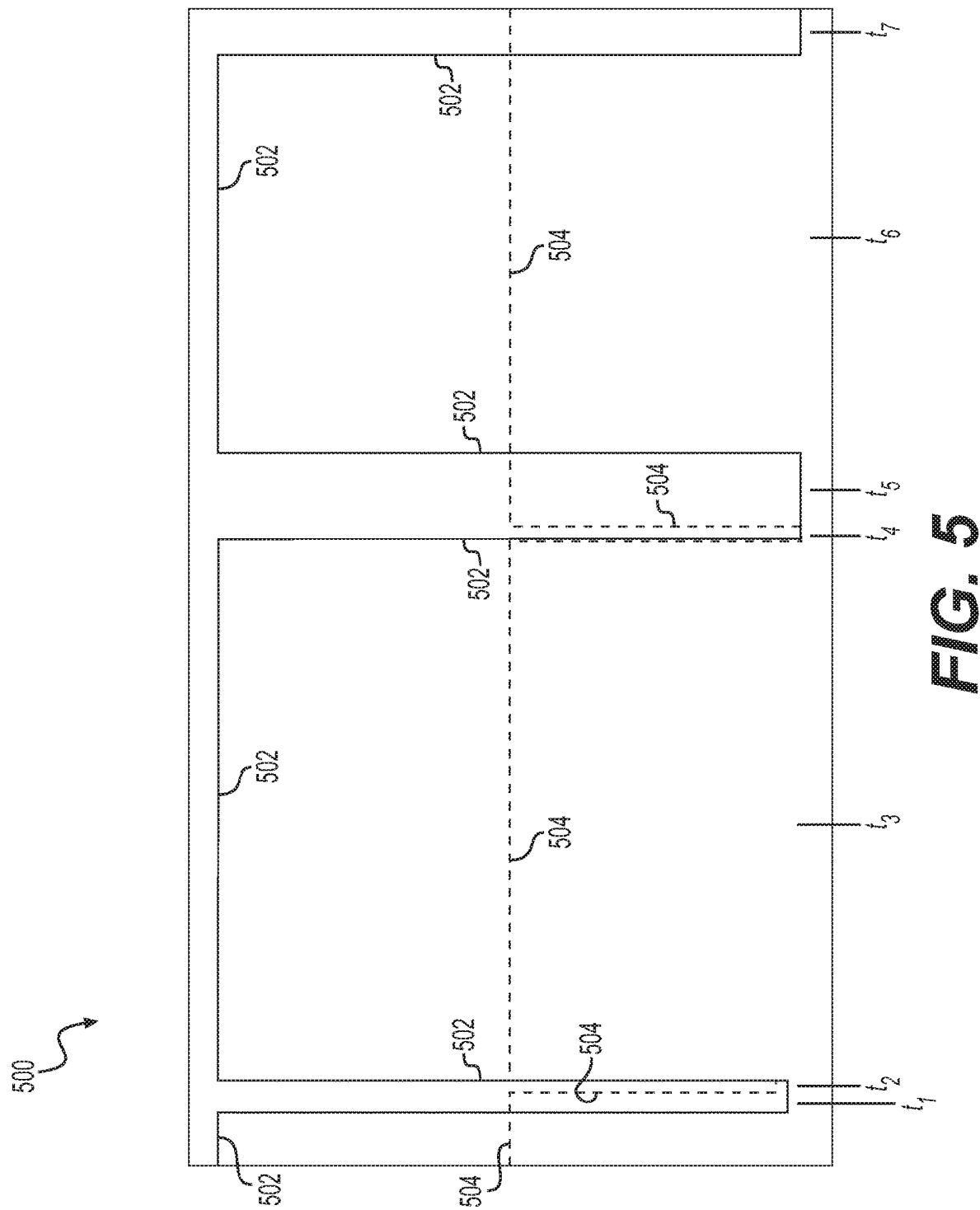
FIG. 5 is a graph showing example states of a drilling machine determined based on the shake-related time line and the movement-related time line shown in FIG. 4.

In the example shown in FIG. 4, the example shake-related time line 306 and the example movement-related time line 308 have been temporally aligned, for example, so that shaking associated with the drilling machine 102 may be correlated (timewise) with movement associated with the drilling machine 102. Thus, by analysis of the graph 400, in some examples, the machine state 132 may be determined for a given time along the shake-related time line 306 and the movement-related time line 308. FIG. 5 is a graph 500 showing example machine states 132 of the drilling machine 102 determined based on the shake-related time line 306 and the movement-related time line 308 shown in FIG. 4. As shown in FIG. 5, the solid line 502 represents drilling associated with the drilling machine 102 as a function of time derived from the vibration signals 124, for example, by the one or more detection processor(s) 304. Relative to the solid line 502, the Y-axis of the graph 500 is indicative of the drilling state of the drilling machine 102, and the X-axis of the graph 500 is indicative of time. In the example shown, the solid line 504 represents a square form signal generated from the combined deviation signal shown as the dashed line 402 in FIG. 4. In examples, the square form may be generated using signal processing techniques. On the solid line 504, relatively high levels indicate drilling.

The dashed line 504 represents movement of the drilling machine 102 as a function of time derived from the movement signals 126, for example, by the one or more detection processor(s) 304. Relative to the dashed line 504, the Y-axis of the graph 500 is indicative of movement of the drilling machine 102, and the X-axis of the graph 500 is indicative of time. In the example shown, the solid line 502 is derived from the solid line 402 in the graph 400 of FIG. 4 using signal processing techniques. Accordingly, and as in FIG. 4, the relatively high levels of the dashed line 504 are indicative of the drilling machine 102 being stopped, and the relatively lower levels of the dashed line 504 are indicative of the drilling machine 102 moving.

By analysis of the graph 500, in some examples, the machine state 132 may be determined for a given time along the drilling-related time line 306 and the movement-related time line 308. For instance, the status of the drilling machine 102 can be determined by intersecting the two square wave signals, e.g., the signals represented by the solid line 502 and the dashed line 504. For example, at a time $t_1$ shown in the graph 500, the solid line 502 indicates that drilling machine 102 is not drilling and the dashed line 504 indicates that the drilling machine is not moving. At the time $t_1$, the machine may be idling. At a time $t_2$ shown in the graph 500, the solid line 502 indicates that drilling machine 102 is not drilling and the dashed line 504 indicates that the drilling machine is moving. At the time $t_2$, the machine may be moving to the next hole. At a time $t_3$ shown in the graph 500, the solid line 502 indicates that drilling machine 102 is drilling and the dashed line 504 indicates that the drilling machine is stationary. At the time $t_3$, the machine may be drilling a hole. FIG. 5 also illustrates times $t_4$-$t_7$. As will be appreciated, activity at the time $t_4$ may generally correspond to activity at the time $t_2$, activity at the times is and $t_7$ may generally correspond to activity at the time $t_1$, and activity at the time $t_6$ may generally correspond to activity at the time $t_3$. As illustrated in the graph 500 of FIG. 5, the square wave functions provide a binary moving state, e.g., moving or stationary, and a binary drilling state, e.g., drilling or not drilling. As a result, one of four states of the vehicle are readily discerned, e.g., by determining the moving state and the drilling state at a given time. In examples, there may be some post-processing of the intersected signal. In some examples, short durations may be removed. In one non-limiting example, a minimum duration may be determined, and any portion of the square wave that is less than the duration is apportioned to surrounding intervals.

Figure 6:
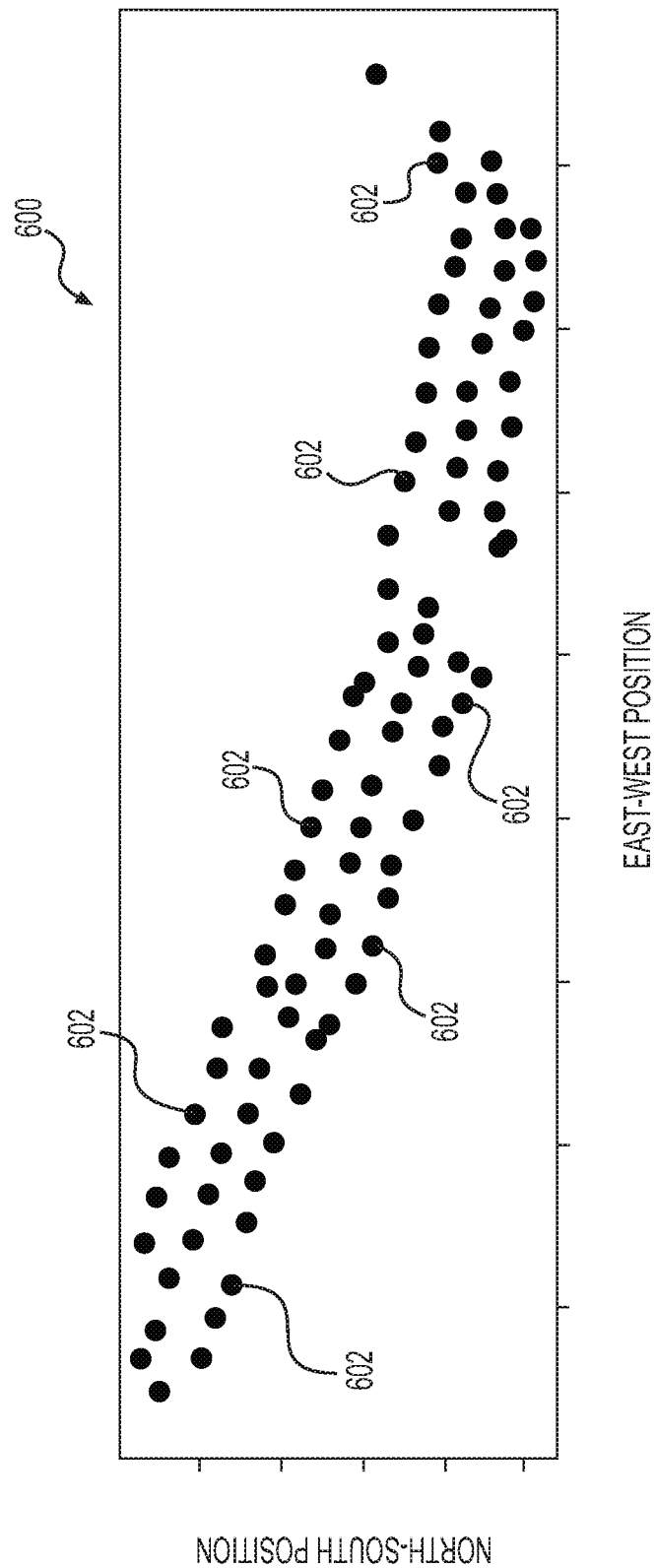
FIG. 6 is an example of a map of holes drilled into the substrate of a worksite by a drilling machine generated based on example vibration signals and example movement signals associated with the drilling machine.

FIG. 6 is an example of a map 600 of holes 602 drilled into the substrate 106 of a worksite by a drilling machine 102 generated based on example vibration signals 124 and example movement signals 126 associated with the drilling machine 102. On the example map 600, the Y-axis represents a north-south position (e.g., north-south geo-location) of the holes 602, and the X-axis represents the east-west position (e.g., the east-west geo-location) of the holes 602. The example map 600 shows the positions of each of the holes 602 drilled by a drilling machine 102, and based on the map 600, the number of holes 602 drilled by a drilling machine may be determined for a given period of time (e.g., during a work shift associated with the drilling machine 102 and/or an operator of the drilling machine 102), and in some examples, the position on the substrate 106 of each of the holes 602 may be determined. In examples, locations of the holes 602 may be resolved by assigning weighted GPS locations associated with intervals in which the drilling machine 102 is determined to be drilling a hole. These intervals may be the intervals in FIG. 5 in which the machine is stationary and drilling. In FIG. 5, one such interval includes the time $t_3$ and another includes the time $t_6$. In some examples, the map 600 may be indicative of the holes 602 drilled by a single drilling machine 102, and in some examples, the map 600 may be indicative of the holes 602 drilled by two or more drilling machines 102, for example, by combining the data received from more than one drilling machine 102. In some such examples, the map 600 may identify the drilling machine 102 that drilled each of the holes 602.

Figure 7:
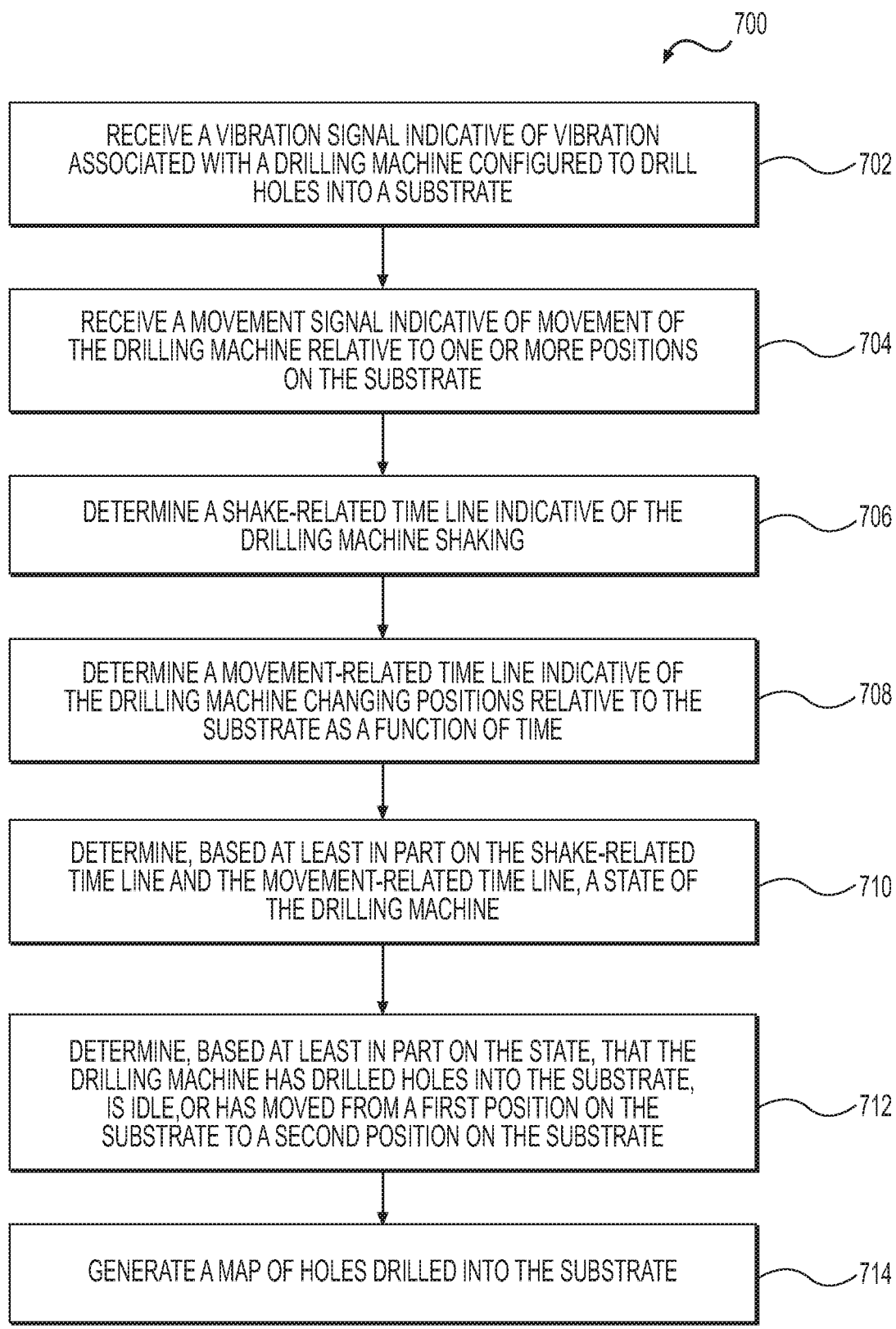
FIG. 7 is an example process for detecting drilling associated with a drilling machine at a worksite.

FIG. 7 is an example process 700 for detecting occurrences associated with a drilling machine configured to drill holes into a substrate. This process 700 is illustrated as a logical flow graph, operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the process.

FIG. 7 illustrates a flow diagram of an example process 700 for detecting occurrences associated with a drilling machine configured to drill holes into a substrate, for example, at a worksite such as a mining worksite. The example process 700, at 702, may include receiving a vibration signal indicative of vibration associated with a drilling machine configured to drill holes into a substrate. For example, drilling detection circuitry including one or more detection processors may be configured to receive one or more vibration signals from one or more vibration sensors associated with the drilling machine, for example, as described herein. The vibration sensors may include one or more accelerometers, one or more gyroscopes, one or more inertial measurement units (IMUs), and/or any other known sensors configured to generate signals indicative of vibration associated with a machine.

The example process 700, at 704, may include receiving a movement signal indicative of movement of the drilling machine relative to one or more positions on the substrate. For example, a drilling detection circuitry including one or more detection processors may be configured to receive one or more movement signals indicative of movement of the drilling machine relative to one or more positions on the substrate, for example, as described herein. The movement sensors may include a global positioning system (GPS) receiver and/or any other known sensors configured to generate signals indicative of movement of a machine.

At 706, the example process 700 may include determining a shake-related time line indicative of the drilling machine shaking or not shaking, for example, as a function of time. For example, the shake-related time line may be determined based at least in part on the vibration associated with the drilling machine as a function of time, for example, as described herein. For example, a drilling detection circuitry including one or more detection processors may be configured to receive the one or more vibration signals and generate a shake-related time line, for example, as described herein.

The example process 700, at 708, may also include determining a movement-related time line indicative of the drilling machine changing positions relative to the substrate, for example, as a function of time. For example, the movement-related time line may be determined based at least in part on the movement associated with the drilling machine as a function of time. For example, a drilling detection circuitry including one or more detection processors may be configured to receive the one or more movement signals and generate a movement-related time line, for example, as described herein.

At 710, the example process 700 may include determining, based at least in part on the shake-related time line and the movement-related time line, a state of the drilling machine. For example, a drilling detection circuitry including one or more detection processors may be configured to temporally align the shake-related time line and the movement-related time line and determine the state of the drilling machine, for example, as described herein.

At 712, the example process 700 may include determining, based at least in part on the state of the drilling machine, that the drilling machine has drilled holes into the substrate, is idle, or has moved from a first position on the substrate to a second position on the substrate. For example, a drilling detection circuitry including one or more detection processors may be configured to determine that the drilling machine has drilled holes into the substrate, is idle, and/or has moved from a first position on the substrate to a second position on the substrate, for example, based on the state of the machine.

The example process 700, at 714, may include generating a map of holes drilled into the substrate, for example, based at least in part on the vibration associated with the drilling machine and the movement associated with the drilling machine. For example, a drilling detection circuitry including one or more detection processors may be configured to determine, based at least in part on the vibration and the movement associated with the drilling machine, a plurality of positions on the substrate at which a respective plurality of holes has been drilled into the substrate, for example, as described herein.

INDUSTRIAL APPLICABILITY

The systems and methods described herein may be used in association with operation of machines at a worksite, for example, to improve the efficiency of management of operations associated with the worksite. For example, a worksite such as a mining worksite may include numerous machines of different types, each performing different operations in a coordinated manner to achieve a desired outcome on the worksite. For example, a drilling machine may be used to drill a plurality of holes in a substrate of the worksite. The holes may receive explosives, and controlled detonation of the explosives may result in preparing the substrate for removal and/or processing, for example, by loaders and/or haul trucks. As a result, it may be desirable to record the number of holes drilled by the machine and/or the locations of the respective holes. Although recording such information may be performed manually, for example, by an operator of the drilling machine, manual recordation of the information may suffer from inaccuracies, such as the incorrect number of holes and/or the incorrect locations of the holes. In addition, manually recorded information may also need to be manually entered into a worksite management system, which may result in entry errors and the need for additional personnel, particularly for worksites including a large number of machines for which information is manually entered. Some examples, of the systems and methods described herein may result in substantially automatic recordation of information, such as the number of holes drilled by a drilling machine and/or the respective locations at the worksite of the drilled holes based on vibration associated with the drilling machine and movement of the drilling machine, for example, as described herein. In some examples, the systems and methods may be configured to generate a map of the holes drilled by one or more drilling machines.

For example, in at least some systems and methods consistent with the systems and methods described herein, sensors associated with a drilling machine may be configured to generate one or more signals indicative of vibration associated with the drilling machine and one or more signals indicative of movement associated with the drilling machine between one or more positions at the worksite. In some examples, the sensors may include relatively low-cost inertial measurement unit (IMU) sensors, such as accelerometers and/or gyroscopes, configured to generate one or more vibration signals indicative of vibration associated with the drilling machine. The sensors may also include one or more relatively low-cost GPS receivers configured to generate one or more movement signals indicative of movement of the drilling machine. In some examples, the sensors may include sensors having an accuracy at least substantially consistent with IMUS and/or GPS receivers included in hand-held computing devices, such as smart phones. In some examples, one or more of the sensors may be incorporated into an electronic control module coupled to the drilling machine. At least some such examples may result in providing a relatively low-cost ability to determine the number of holes drilled by a drilling machine and/or the respective locations of the holes. In some examples, other sensor types and/or sensors having different levels of accuracy are contemplated.

The system and methods described herein, in some examples, may be configured to receive the vibration signals and the movement signals, and generate a shake-related time line and a movement-related time line, for example, as described herein. The shake-related time line may be temporally aligned with (e.g., intersected with) the movement-related time line, and analysis of the temporally aligned shake-related time line and the movement-related time line may result in determining the machine state associated with the drilling machine, such as, shaking and moving, shaking and not moving, not shaking and moving, and not shaking and not moving. The machine state may be used to determine whether the drilling machine is idle (e.g., not shaking and not moving), is moving between locations but not drilling (e.g., moving and shaking), not moving and drilling (e.g., shaking but not moving), and is being transported via a trailer (e.g., not shaking and moving). In some examples, the systems and methods may use filtering techniques and/or statistical analysis techniques to determine whether detected shaking is a result of drilling or moving, and/or whether detected movement is a result of signal drift associated with the GPS receiver or actual movement of the drilling machine, for example, as described herein. As described herein, according to at least some examples of the systems and methods, the machine state may be used to determine a number of holes drilled by a drilling machine and/or the respective locations of the holes.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

What is claimed is:

1. A drilling detection system comprising:
   machine vibration detection circuitry to determine vibration associated with a drilling machine in response to receiving a vibration signal associated with the drilling machine, the vibration signal, at least when the drilling machine is stopped, indicative of whether a drilling apparatus of the drilling machine is at idle;
   machine movement detection circuitry to determine movement associated with the drilling machine in response to receiving a movement signal associated with the movement of the drilling machine on a substrate;
   machine state determination circuitry to determine a number of holes drilled by the drilling machine on the substrate and locations of the holes on the substrate based at least in part on the vibration associated with the drilling machine and the movement of the drilling machine, wherein the movement of the drilling machine on the substrate is determined based on a pattern of holes including partially randomly scattered holes across an area of the substrate; and
   one or more detection processors to:
   distinguish the vibration signal by determining whether the vibration signal is indicative of shaking associated with:
   drilling by the drilling apparatus, or
   the movement of the drilling machine, and
   generate a map of the holes drilled into the substrate, based at least in part on the vibration associated with the drilling machine and the movement of the drilling machine, the map of the holes including the partially randomly scattered holes across the area of the substrate and corresponding to the pattern of holes.

2. The drilling detection system of claim 1, further comprising a vibration detection sensor configured to generate the vibration signal indicative of vibration associated with the drilling machine, the vibration signal based on a magnitude of a sum of X-axis, Y-axis, and Z-axis acceleration standard deviations.

3. The drilling detection system of claim 1, further comprising a movement sensor configured to generate the signal indicative of movement of the drilling machine,
   wherein the one or more detection processors determine whether the vibration signal is indicative of shaking associated with drilling by the drilling machine or the movement of the drilling machine by, at least one of:
   utilizing a Kalman filter, or
   utilizing statistical analysis.

4. The drilling detection system of claim 1, wherein the one or more detection processors are further configured to determine, based at least in part on the vibration associated with the drilling machine and the movement associated with the drilling machine, a state of the drilling machine, wherein the state of the drilling machine comprises one of shaking and moving, shaking and stopped, or not shaking and stopped.

5. The drilling detection system of claim 4, wherein the one or more detection processors are further configured to determine, based at least in part on the state, that the drilling machine has drilled holes into the substrate, is idle, or has moved from a first position on the substrate to a second position on the substrate.

6. The drilling detection system of claim 1, wherein the one or more detection processors are further configured to:
   determine, based at least in part on the vibration associated with the drilling machine and the movement associated with the drilling machine, a shake-related time line indicative of the drilling machine shaking or not shaking as a function of time and a movement-related time line indicative of the drilling machine changing positions relative to the substrate as a function of time; and
   determine, based at least in part on the shake-related time line and the movement related time line, a state of the drilling machine,
   wherein the state of the drilling machine comprises one of shaking and moving, shaking and stopped, or not shaking and stopped.

7. The drilling detection system of claim 1, wherein the one or more detection processors are further configured to determine, based at least in part on the vibration associated with the drilling machine and the movement associated with the drilling machine, a number of holes drilled into the substrate by the drilling machine.

8. The drilling detection system of claim 1, wherein the one or more detection processors are further configured to determine, based at least in part on the vibration associated with the drilling machine and the movement associated with the drilling machine, a plurality of positions on the substrate at which a respective plurality of holes has been drilled into the substrate.

9. A method for detecting drilling occurrences associated with a drilling machine configured to drill holes into a substrate, the method comprising:
   receiving a vibration signal associated with a drilling machine, the vibration signal, at least when the drilling machine is stopped, indicative of whether a drilling apparatus of the drilling machine is at idle;
   receiving a movement signal indicative of movement of the drilling machine relative to one or more positions on the substrate;
   determining movement associated with the drilling machine, wherein the movement of the drilling machine on the substrate is determined based on a pattern of holes including partially randomly scattered holes across an area of the substrate;

distinguishing vibration associated with the drilling machine by determining whether the vibration signal is indicative of shaking associated with:
  drilling by the drilling apparatus, or
  the movement of the drilling machine;
determining, based at least in part on the vibration associated with the drilling machine and the movement of the drilling machine, the drilling machine has drilled holes into the substrate and a position on the substrate at which the drilling machine has drilled the holes into the substrate; and
generating a map of the holes drilled into the substrate, the map including the partially randomly scattered holes across the area of the substrate and corresponding to the pattern of holes.

10. The method of claim 9, wherein receiving the vibration signal comprises receiving the vibration signal from a vibration detection sensor configured to generate the vibration signal indicative of vibration associated with the drilling machine, the vibration signal based on a magnitude of a sum of X-axis, Y-axis, and Z-axis acceleration standard deviations.

11. The method of claim 9, wherein receiving the movement signal comprises receiving the movement signal from a movement sensor configured to generate the movement signal indicative of movement of the drilling machine,
  wherein determining whether the vibration signal is indicative of shaking associated with drilling by the drilling machine or the movement of the drilling machine includes, at least one of:
    utilizing a Kalman filter, or
    utilizing statistical analysis.

12. The method of claim 9, further comprising determining, based at least in part on the vibration associated with the drilling machine and the movement associated with the drilling machine, a state of the drilling machine, wherein the state of the drilling machine comprises one of shaking and moving, shaking and stopped, or not shaking and stopped.

13. The method of claim 12, further comprising determining, based at least in part on the state, that the drilling machine has drilled holes into the substrate, is idle, or has moved from a first position on the substrate to a second position on the substrate.

14. The method of claim 9, further comprising:
determining, based at least in part on the vibration associated with the drilling machine and the movement associated with the drilling machine, a shake-related time line indicative of the drilling machine shaking or not shaking as a function of time and a movement-related time line indicative of the drilling machine changing positions relative to the substrate as a function of time; and
determining, based at least in part on the shake-related time line and the movement related time line, a state of the drilling machine,
  wherein the state of the drilling machine comprises one of shaking and moving, shaking and stopped, or not shaking and stopped.

15. The method of claim 9, further comprising determining, based at least in part on the vibration associated with the drilling machine and the movement associated with the drilling machine, a number of holes drilled into the substrate by the drilling machine.

16. The method of claim 9, further comprising determining, based at least in part on the vibration associated with the drilling machine and the movement associated with the drilling machine, a plurality of positions on the substrate at which a respective plurality of holes has been drilled into the substrate.

17. A machine comprising:
a chassis;
a drilling apparatus coupled to the chassis and configured to drill holes into a substrate; and
a drilling detection circuitry comprising one or more detection processors configured to:
  receive a vibration signal associated with the machine, the vibration signal, at least when the machine is stopped, indicative of whether the drilling apparatus is at idle;
  receive a movement signal indicative of movement of the machine relative to one or more positions on the substrate;
  determine movement associated with the machine, wherein the movement of the drilling machine on the substrate is determined based on a pattern of holes including partially randomly scattered holes across an area of the substrate;
  distinguish vibration associated with the machine by determining whether the vibration signal is indicative of shaking associated with:
    drilling by the drilling machine, or
    the movement of the drilling machine;
  determine, based at least in part on the vibration associated with the machine and the movement of the machine, the machine has drilled holes into the substrate and a position on the substrate at which the machine has drilled the holes into the substrate; and
  generate a map of the holes drilled into the substrate, the map including the partially randomly scattered holes across the area of the substrate and corresponding to the pattern of holes.

18. The machine of claim 17, wherein determining whether the vibration signal is indicative of shaking associated with drilling by the drilling machine or the movement of the drilling machine includes, at least one of:
  utilizing a Kalman filter, or
  utilizing statistical analysis.

19. The machine of claim 17, wherein the drilling detection circuitry is configured to determine, based at least in part on the vibration associated with the machine and the movement associated with the machine, a plurality of positions on the substrate at which a respective plurality of holes has been drilled into the substrate.

20. The machine of claim 17, wherein the drilling detection circuitry is further configured to determine, based on the map, a number of holes drilled into the substrate by the drilling machine for a given period of time.

* * * * *